(12) United States Patent
Uppu

(10) Patent No.: US 11,522,489 B2
(45) Date of Patent: Dec. 6, 2022

(54) BONDING CLAMP AS PHOTOVOLTAIC MODULE MOUNTING EQUIPMENT

(71) Applicant: Unirac Inc., Albuquerque, NM (US)

(72) Inventor: Sai Uppu, Albuquerque, NM (US)

(73) Assignee: Unirac Inc., Albuquerque, NM (US)

(*) Notice: Subject to any disclaimer, the term of this patent is extended or adjusted under 35 U.S.C. 154(b) by 162 days.

(21) Appl. No.: 16/837,749

(22) Filed: Apr. 1, 2020

(65) Prior Publication Data

US 2020/0313603 A1 Oct. 1, 2020

Related U.S. Application Data

(60) Provisional application No. 62/827,544, filed on Apr. 1, 2019.

(51) Int. Cl.
| | | |
|---|---|---|
| *H02S 20/20* | (2014.01) | |
| *F24S 25/636* | (2018.01) | |
| *F24S 25/35* | (2018.01) | |
| *F16B 2/06* | (2006.01) | |
| *F24S 25/60* | (2018.01) | |
| *F24S 25/00* | (2018.01) | |

(52) U.S. Cl.
CPC .............. *H02S 20/20* (2014.12); *F16B 2/065* (2013.01); *F24S 25/35* (2018.05); *F24S 25/636* (2018.05); *F24S 2025/014* (2018.05); *F24S 2025/6003* (2018.05); *F24S 2025/6005* (2018.05); *F24S 2025/80* (2018.05)

(58) Field of Classification Search
CPC ......... H02S 20/20; F24S 25/636; F24S 25/35; F24S 2025/6005; F24S 2025/80; F24S 2025/6003; F16B 2/065
See application file for complete search history.

(56) References Cited

U.S. PATENT DOCUMENTS

| | | | |
|---|---|---|---|
| D224,406 S | 7/1972 | Heck | |
| 4,966,631 A * | 10/1990 | Matlin | F24S 25/12 136/244 |
| D342,011 S | 12/1993 | Maguire | |
| D401,211 S | 11/1998 | Simpson | |
| D627,717 S | 11/2010 | Munoz et al. | |
| 7,866,099 B2 | 1/2011 | Komamine et al. | |

(Continued)

OTHER PUBLICATIONS

Ecodirect, retrieved on Mar. 29, 2022, at <<https://www.ecodirect.com/S-5-PV-Kit-UL-for-mounting-PV-Modules-p/s-5-pv-kit-ul-htm>>, 2010, 6 pgs.

(Continued)

*Primary Examiner* — Eret C McNichols
(74) *Attorney, Agent, or Firm* — Lee & Hayes, P.C.

(57) ABSTRACT

A bonding clamp includes a top bracket including opposing side walls defining a channel therebetween. The top bracket has an aperture through a central portion thereof. The top bracket is shaped to receive a first photovoltaic ("PV") module on a first side and a second PV module on a second side. A bottom bracket includes a body and a pair of top flanges extending vertically from a top surface of the body. The pair of top flanges are spaced apart from each other. The bottom bracket also includes anti-rotation flanges extending from a bottom surface of body. A fastening mechanism fastens the top bracket in a fixed position with respect to the bottom bracket.

19 Claims, 5 Drawing Sheets

(56) References Cited

U.S. PATENT DOCUMENTS

| | | |
|---|---|---|
| D699,176 S | 2/2014 | Salomon et al. |
| 8,938,932 B1 | 1/2015 | Wentworth et al. |
| 9,431,953 B2 | 8/2016 | Stearns et al. |
| 9,825,581 B2 | 11/2017 | Wildes |
| 9,837,955 B1 | 12/2017 | Schuit et al. |
| 10,340,838 B2 * | 7/2019 | Schuit .................... F24S 25/35 |
| 10,461,682 B2 * | 10/2019 | Schuit .................. F24S 25/632 |
| 10,594,250 B2 * | 3/2020 | Schuit .................... F24S 25/35 |
| 10,742,160 B2 | 8/2020 | Kobayashi |
| 10,797,634 B1 * | 10/2020 | Jasmin .................... H02S 20/23 |
| D901,404 S | 11/2020 | Ice et al. |
| 10,845,093 B2 * | 11/2020 | Stephan ................ F24S 25/636 |
| D904,861 S | 12/2020 | McWilliams |
| 11,251,743 B2 | 2/2022 | Schuit et al. |
| 2006/0086382 A1 * | 4/2006 | Plaisted .................. H02S 20/23 136/244 |
| 2010/0276558 A1 * | 11/2010 | Faust ...................... F24S 25/61 248/222.14 |
| 2011/0138585 A1 | 6/2011 | Kmita et al. |
| 2012/0073220 A1 | 3/2012 | Kobayashi et al. |
| 2015/0129517 A1 * | 5/2015 | Wildes .................... F24S 25/61 211/41.1 |
| 2015/0168021 A1 * | 6/2015 | Wentworth ............. H02S 20/23 52/173.3 |
| 2015/0280638 A1 * | 10/2015 | Stephan .................. H02S 20/23 52/173.3 |
| 2015/0288320 A1 * | 10/2015 | Stearns ................... H02S 20/23 52/173.3 |
| 2016/0111996 A1 * | 4/2016 | Stephan ................ F16B 5/0028 248/316.6 |
| 2016/0126884 A1 * | 5/2016 | Stearns ................... H02S 30/10 52/173.3 |
| 2016/0268958 A1 * | 9/2016 | Wildes ..................... F24S 25/70 |
| 2017/0237386 A1 * | 8/2017 | Stephan ................ F16B 5/0028 248/316.6 |
| 2017/0366131 A1 * | 12/2017 | Stearns ................. F24S 25/636 |
| 2019/0341878 A1 * | 11/2019 | Watson ................... F24S 30/425 |
| 2020/0059195 A1 * | 2/2020 | Wang ...................... F24S 25/13 |
| 2020/0116191 A1 * | 4/2020 | Uppu ...................... H02S 20/23 |
| 2020/0313603 A1 * | 10/2020 | Uppu ...................... H02S 20/20 |

OTHER PUBLICATIONS

Office Action for U.S. Appl. No. 29/685,944, dated Apr. 11, 2022, Uppu, "Bonding Clamp ", 7 pages.

Quick Mount, retrieved Mar. 29, 2022, at <<https://www.ecodirect.com/Quick-Mount-PV-Quick-Rack-2-35mm-Panel-Clamps-p/quickmount-qmqr-cp35-2-b-24.htm>>, 2015, 9 pgs.

* cited by examiner

BONDING CLAMP AS PHOTOVOLTAIC MODULE MOUNTING EQUIPMENT

CROSS-REFERENCE TO RELATED PATENT APPLICATIONS

This application claims priority to and incorporates U.S. Provisional Patent Application 62/827,544, filed Apr. 1, 2019, entitled "Bonding Clamp as Photovoltaic Module Mounting Equipment," in its entirety by reference.

BACKGROUND

As the solar energy industry is growing, there is a growing need to be able to mount photovoltaic (PV) modules on various types of structures and/or locations. Typical PV module mounting assemblies may be designed with a specific use in mind and, as such, these mounting assemblies may lack variability to be implemented in various situations and/or situations. Furthermore, PV module mounting assemblies may be designed for a specific PV module thickness. Thus, PV module mounting assemblies often lack variability to accommodate PV modules having varying thicknesses.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

DETAILED DESCRIPTION

As described previously, photovoltaic (PV) module mounting assemblies may be designed with a specific use in mind. For example, PV module mounting assemblies may be designed to mount a PV module having a specific thickness. Thus, PV module mounting assemblies often lack adjustability to varying PV module thickness.

This disclosure is directed to a bonding clamp. More specifically, this disclosure describes a bonding clamp that is adjustable in at least a vertical direction. In an embodiment, the bonding clamp may be adjustable to clamp different PV modules having varying thicknesses.

Figure 1:
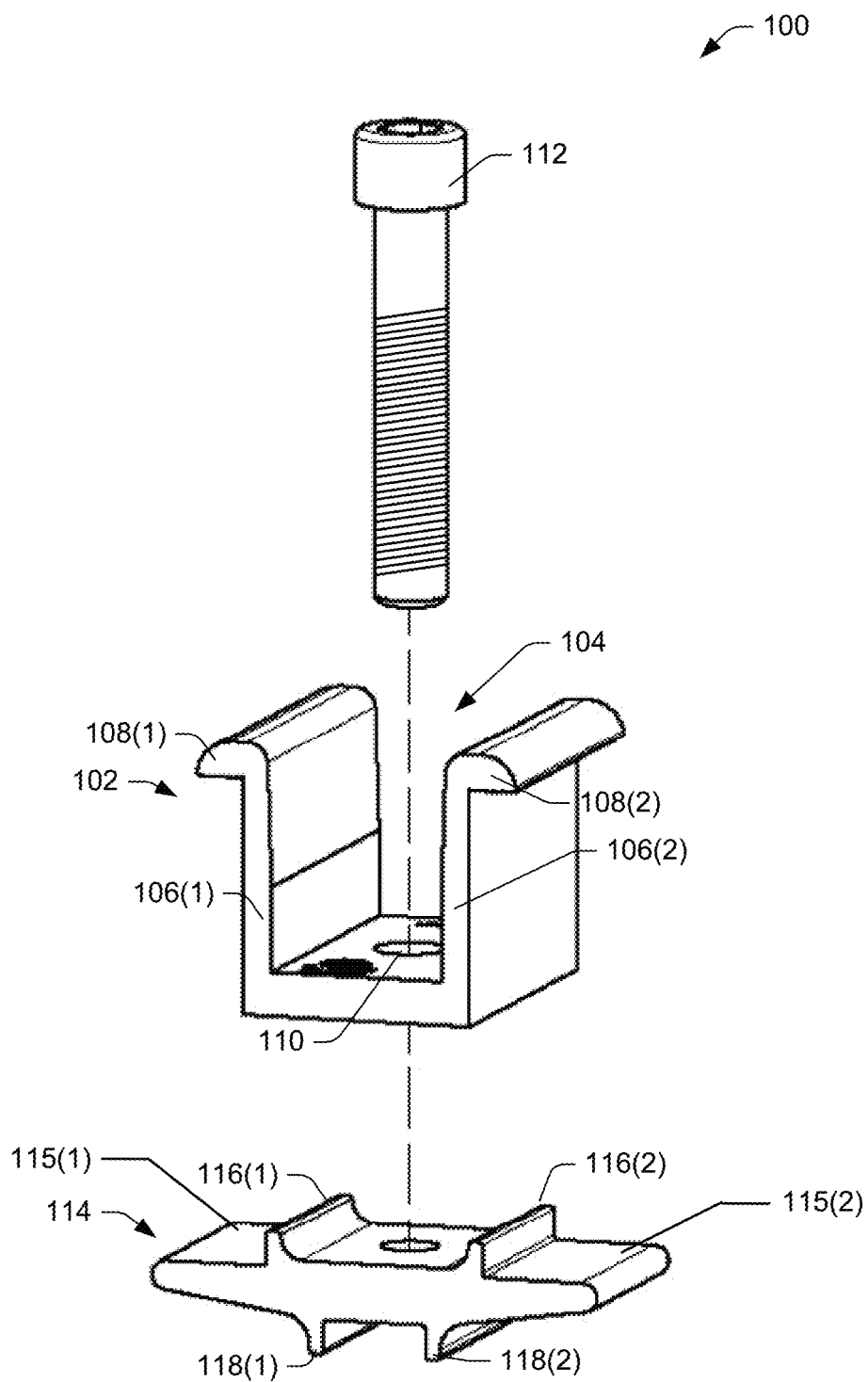
FIG. 1 illustrates a perspective view of a bonding clamp having an internal hex drive fastener according to an embodiment of this disclosure.

FIG. 1 illustrates a perspective view of a bonding clamp 100 according to an embodiment. The bonding clamp 100 may clamp two PV modules, one on either side of the bonding clamp 100. As shown in FIG. 1, the bonding clamp may include a top bracket 102. The top bracket may include a channel 104 through a center of the top bracket 102. In an embodiment, the channel 104 may include a sidewall 106(1) and an opposing sidewall 106(2) defining the inside surfaces of the channel 104. The sidewalls 106(1), 106(2) may include respective flanges 108(1), 108(2) that extend laterally outward from upper edges thereof. In an embodiment, the flanges 108(1), 108(2) may be shaped to correspond with a top surface of a PV module. For example, a direction of extension of the flanges 108(1), 108(2) is transverse with respect to an outer surface of the respective sidewalls 106(1), 106(2), thereby forming a corner angle. The angle of the corner may vary so long as the flanges 108(1), 108(2) are able to capture and secure the PV modules. In an embodiment the flanges 108(1), 108(2) extend orthogonally to the direction of extension of the respective sidewalls 106(1), 106(2).

The top bracket 102 includes an aperture 110 through which a fastener 112 may extend. In an embodiment, the aperture may be located in the center of the top bracket 102. However, in an alternative embodiment, the aperture may be located off-center in the top bracket 102. As shown in FIG. 1, the fastener 112 may be a bolt having a socket cap with an internal hex drive. However, the type of fastener may vary depending on suitability of installation. In an embodiment, an outer surface of the fastener 112 may include threading along a portion or all of a length of the sides of the fastener such that a distance between the top bracket 102 and a bottom bracket 114 may be adjustable.

The bonding clamp 100 may also include bottom bracket 114. The bottom bracket 114 may be fixed in a position with respect to the top bracket 102 via the fastener 112 or another suitable fastening mechanism. A body of the bottom bracket may extend in a horizontal direction such that a PV module may rest on one or both of opposing lateral support landings 115(1), 115(2). The bottom bracket 114 may include a pair of vertically-extending top flanges 116(1), 116(2) (i.e., elongated protrusions) that extend upward from an upper surface of the body of bottom bracket 114 so as to rise above the lateral support landings 115(1), 115(2). The pair of top flanges 116(1), 116(2) may be shaped to abut an edge of a PV module. In an embodiment, the pair of top flanges 116(1), 116(2) extend a vertical distance that is less than a length of horizontal extension of the lateral support landings 115(1), 115(2), when measured from a point of junction therebetween. Moreover, in an embodiment the pair of top flanges 116(1), 116(2) extend orthogonally to the direction of extension of the respective lateral support landings 115(1), 115(2).

Additionally, the pair of top flanges 116(1), 116(2) may also maintain spacing between PV modules that are clamped in the bonding clamp 100. For example, the pair of top flanges 116(1), 116(2) may be spaced from one another such that PV modules held by the bonding clamp 100 will be spaced at a predetermined distance from one another. In an embodiment, the predetermined distance may be approximately 1 inch. However, in an alternative embodiment, the predetermined distance may be between approximately 0.5 inches to approximately 4 inches. Furthermore, the bottom bracket 114 may also include vertically-extending anti-rotation flanges 118(1), 118(2) (i.e., elongated protrusions)

located on a bottom surface of the bottom bracket 114 that extend downward from the body of bottom bracket 114.

Figure 2:
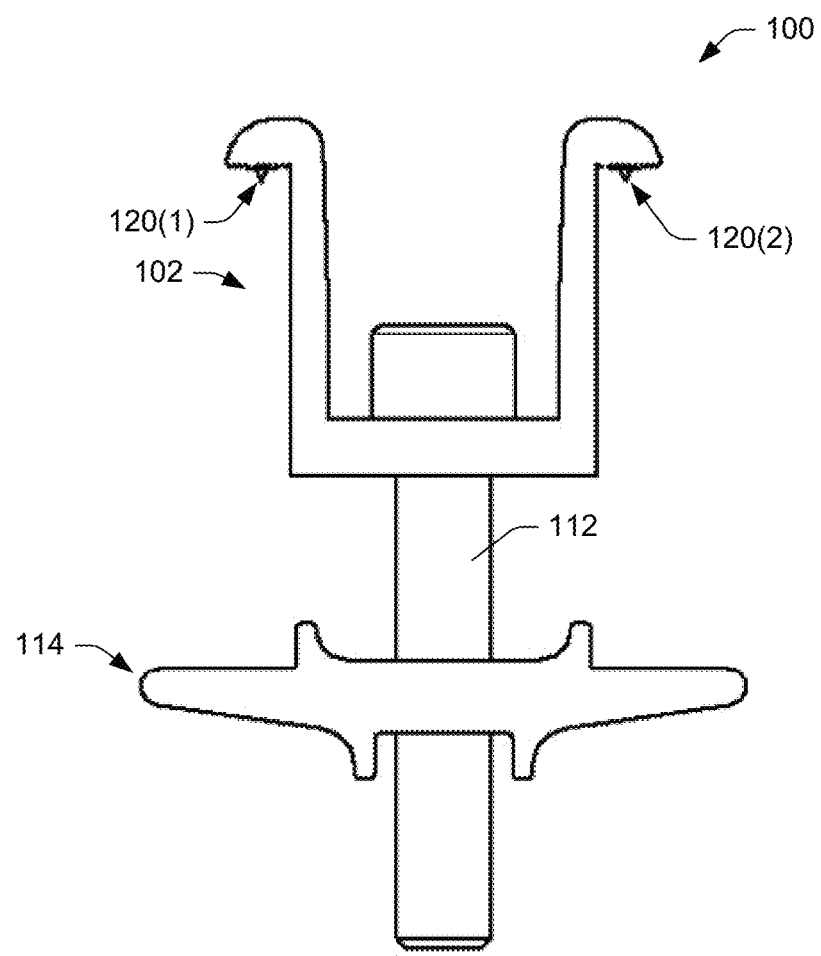
FIG. 2 illustrates a front view of the bonding clamp with a fastener according to an embodiment of this disclosure.

FIG. 2 depicts a front view of the bonding clamp 100. As shown in FIG. 2, the top bracket 102 of the bonding clamp 100 may further include a pair of bonding pins 120(1), 120(2). The bonding pins 120(1), 120(2) may provide an electrical contact with the corresponding PV module, thereby providing electrical communication between the PV modules held by the bonding clamp 100.

Figure 3:
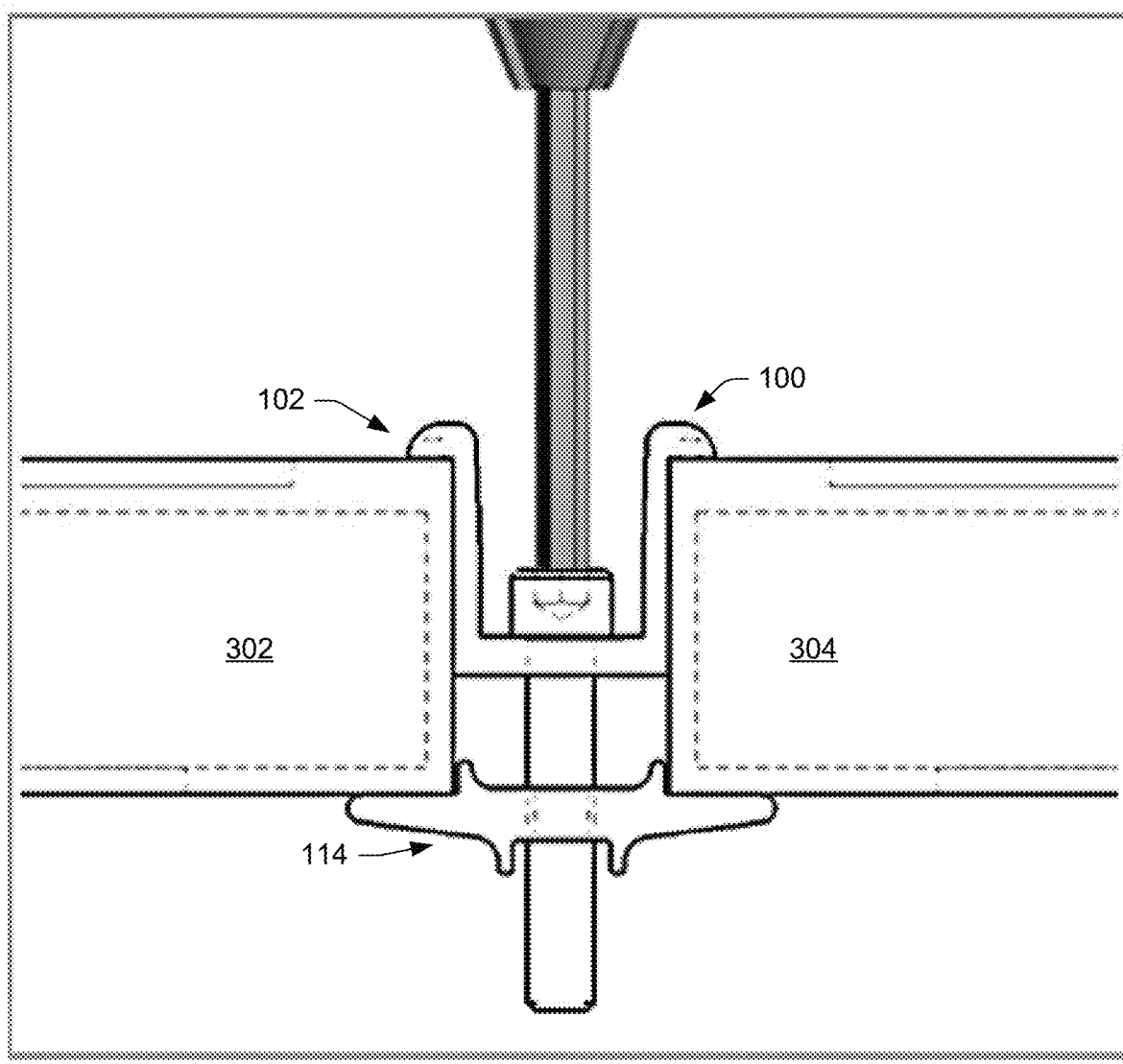
FIG. 3 illustrates a front view of the bonding clamp with a fastener, holding photovoltaic modules, according to an embodiment of this disclosure.

FIG. 3 depicts a front view of the bonding clamp 100 as implemented to secure two PV modules 302 and 304. That is, FIG. 3 depicts the top bracket 102 engaging upper edges of the two PV modules 302, 304 and the bottom bracket 114 engaging lower edges of the two PV modules 302, 304. Moreover, the bonding clamp 100 maintains a space between the two PV modules 302, 304. Further, in FIG. 3, a driver tool is depicted in place as if to rotate and tighten the fastener 112.

Figure 4:
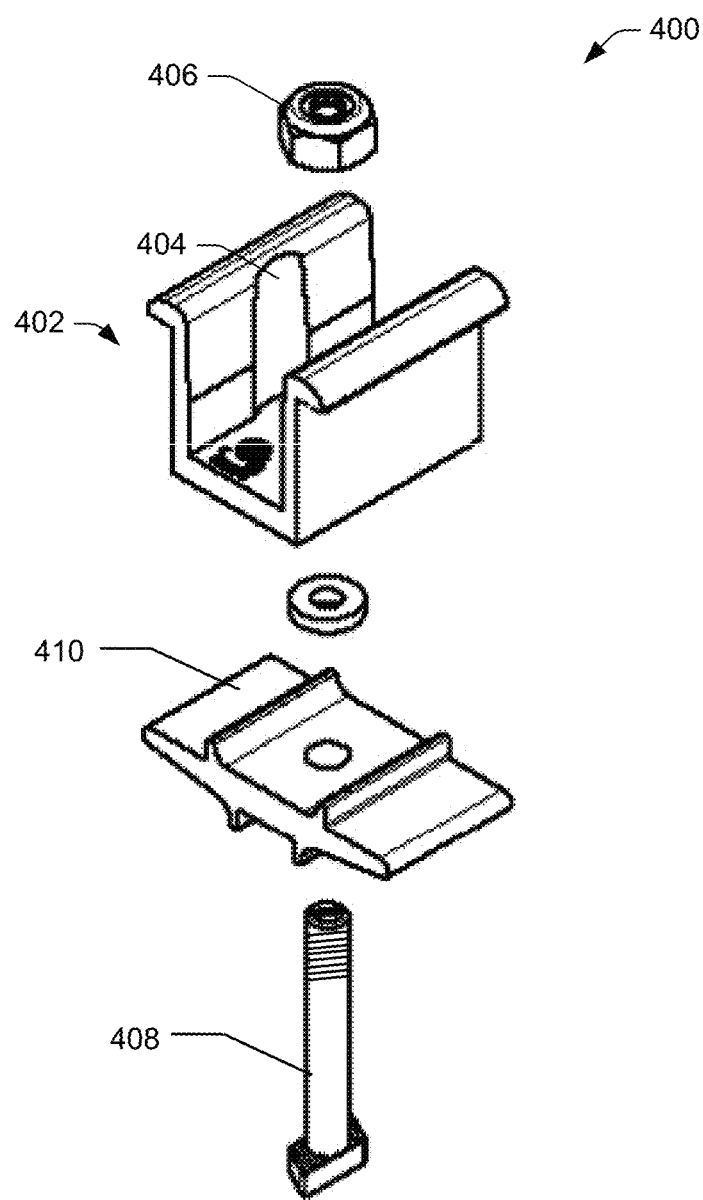
FIG. 4 illustrates a perspective view of a bonding clamp with a fastener according to an embodiment of this disclosure.

FIG. 4 depicts a perspective, exploded view of a bonding clamp 400 according to an embodiment. The bonding clamp 400 may be similar to the bonding clamp 100 described in FIGS. 1-3, with minor differences. For example, the bonding clamp 400 may include a different fastening mechanism than the bonding clamp 100 of FIGS. 1-3. In an embodiment, the bonding clamp 400 may include a top bracket 402 having a tool channel 404 that is shaped to accommodate a tool for tightening a nut 406 with an external hex drive shape to secure a bolt member 408 extending through bottom bracket 410. Alternatively, the bonding clamp 400 may include a different suitable fastening mechanism.

Figure 5:
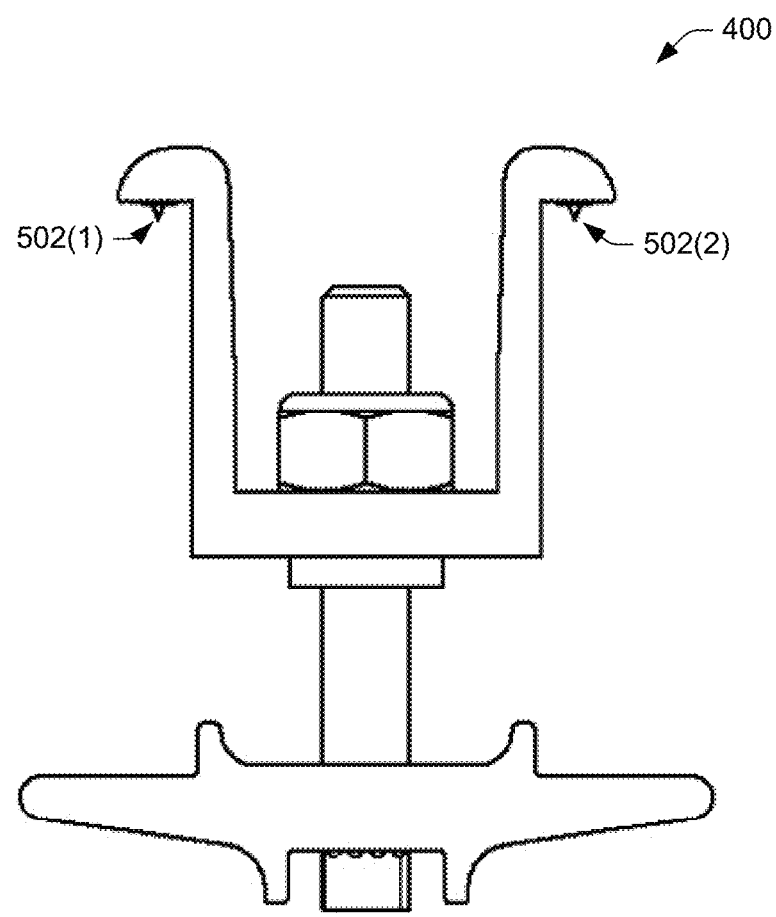
FIG. 5 illustrates a front view of the bonding clamp with a fastener according to an embodiment of this disclosure.

FIG. 5 depicts a front view of the bonding clamp 400 according to an embodiment. As shown in FIG. 5, the bonding clamp 400 may also include bonding pins 502(1), 502(2). The bonding pins 502(1), 502(2) may provide an electrical contact with the corresponding PV module, thereby providing electrical communication between the PV modules held by the bonding clamp 400.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter.

What is claimed is:

1. A bonding clamp comprising:
    a top bracket including opposing sidewalls defining a channel therebetween, the top bracket having an aperture through a central portion thereof, and the top bracket being shaped to receive a first photovoltaic ("PV") module on a first side and a second PV module on a second side;
    a bottom bracket including:
        a body,
        a pair of top flanges extending vertically from a top surface of the body, the pair of top flanges being spaced apart from each other equidistantly as the opposing sidewalls of the top bracket to align therewith, and
        anti-rotation flanges extending from a bottom surface of body; and
    a fastener to fasten the top bracket in a fixed position with respect to the bottom bracket, the fastener having a head shaped and sized to fit between the anti-rotation flanges such that the anti-rotation flanges prevent the fastener from rotation.

2. The bonding clamp according to claim 1, wherein the fastener includes threading such that a vertical distance between the top bracket and the bottom bracket is adjustable.

3. The bonding clamp according to claim 1, wherein the fastener extends through the aperture in the top bracket and into the bottom bracket.

4. The bonding clamp according to claim 1, wherein the sidewalls of the top bracket each include an outwardly extending flange.

5. The bonding clamp according to claim 4, wherein the outwardly extending flanges of the top bracket extend orthogonally to the respective sidewalls.

6. The bonding clamp according to claim 1, wherein the bottom bracket further includes a pair of oppositely extending lateral support landings that extend laterally from the body.

7. The bonding clamp according to claim 6, wherein a height of vertical extension of the pair of top flanges of the bottom bracket is less than a length of horizontal extension of the pair of lateral support landings, respectively.

8. A bonding clamp comprising:
    a top bracket including opposing sidewalls defining a channel therebetween, the top bracket having an aperture through a central portion thereof, and the top bracket being shaped to receive a first photovoltaic ("PV") module on a first side and a second PV module on a second side; and
    a bottom bracket having an aperture therethrough, the bottom bracket including:
        a body from which extend on opposite sides a pair of support landings,
        a pair of top flanges extending vertically from a top surface of the body, the pair of top flanges being spaced apart from each other equidistantly as the opposing sidewalls of the top bracket to align therewith, and
        anti-rotation flanges extending from a bottom surface of body,
    wherein the aperture of the top bracket and the aperture of the bottom bracket are equally sized to accept a fastener therethrough, and
    wherein the fastener has a head shaped and sized to fit between the anti-rotation flanges such that the anti-rotation flanges prevent the fastener from rotation.

9. The bonding clamp according to claim 8, further comprising the fastener, wherein the fastener is configured to fasten the top bracket in a fixed position with respect to the bottom bracket.

10. The bonding clamp according to claim 8, further comprising the fastener, wherein the fastener is configured to extend through the bottom bracket and through the top bracket whereat a distal end of the fastener is secured to the top bracket via a nut.

11. The bonding clamp according to claim 8, wherein the top bracket is configured to be positioned in varying heights above the bottom bracket to accommodate varying thicknesses of PV modules to be secured therebetween.

12. The bonding clamp according to claim 8, wherein the sidewalls of the top bracket each include an outwardly extending flange.

13. The bonding clamp according to claim 12, wherein the outwardly extending flanges of the top bracket extend orthogonally to the respective sidewalls.

14. The bonding clamp according to claim 12, wherein the outwardly extending flanges extend in a direction parallel to a direction of extension of the support landings.

15. A bonding clamp comprising:
- a top bracket including:
  - a central portion,
  - opposing sidewalls extending from the central portion and defining a channel therebetween,
  - an aperture through the central portion thereof, and
  - a pair of outwardly extending flanges that extend transversely from the opposing sidewalls; and
- a bottom bracket including:
  - a body from which extend on opposite sides a pair of support landings,
  - a pair of top flanges extending vertically from a top surface of the body, the pair of top flanges being spaced apart from each other equidistantly as the opposing sidewalls of the top bracket to align therewith,
  - a pair of anti-rotation flanges extending from a bottom surface of body in a direction opposite the pair of top flanges; and
  - a fastener having a head shaped and sized to fit between the pair of anti-rotation flanges such that the pair of anti-rotation flanges prevent the fastener from rotation.

16. The bonding clamp according to claim 15, wherein the fastener is a bolt sized to extend through both the top bracket and the bottom bracket.

17. The bonding clamp according to claim 16, wherein the top bracket further includes a tool channel formed into an inner surface of the opposing sidewalls of the top bracket and shaped to accommodate a tool for tightening a nut onto the bolt within the bonding clamp.

18. The bonding clamp according to claim 15, wherein the top bracket further includes one or more bonding pins that protrude downwardly from one or both of the outwardly extending flanges of the top bracket.

19. The bonding clamp according to claim 15, wherein the fastener is further sized to extend through the top bracket and the bottom bracket and maintain a space therebetween.

* * * * *